United States Patent
Ge (10) Patent No.: US 6,707,559 B2
(45) Date of Patent: Mar. 16, 2004

(54) METHOD OF DETECTING POSTURE OF OBJECT AND APPARATUS USING THE SAME

(75) Inventor: Zongtao Ge, Saitama (JP)

(73) Assignee: Fuji Photo Optical Co., Ltd., Saitama (JP)

( * ) Notice: Subject to any disclaimer, the term of this patent is extended or adjusted under 35 U.S.C. 154(b) by 236 days.

(21) Appl. No.: 10/021,014

(22) Filed: Dec. 19, 2001

(65) Prior Publication Data

US 2002/0113973 A1 Aug. 22, 2002

(30) Foreign Application Priority Data

Dec. 27, 2000 (JP) ........................................ 2000-397246
Nov. 20, 2001 (JP) ........................................ 2001-354545

(51) Int. Cl.[7] ................................................ G01B 9/02
(52) U.S. Cl. ........................ 356/508; 356/510; 356/512
(58) Field of Search ................................. 356/496, 508, 356/510, 490, 492, 511, 512, 513, 514

(56) References Cited

U.S. PATENT DOCUMENTS 5,546,185 A * 8/1996 Okumura et al. ............ 356/510
6,532,073 B2 * 3/2003 Ge ............................... 356/512

OTHER PUBLICATIONS

Takeda, Mitsuo et al., "Fourier–Transform Method," *Journal of the Optical Society of America*, Jan. 1982, pp. 156–158, vol. 72, No. 1.

* cited by examiner

*Primary Examiner*—Samuel A. Turner
(74) *Attorney, Agent, or Firm*—Snider & Associates; Ronald R. Snider (57) ABSTRACT

A method of detecting a posture of an object comprises the steps of acquiring fringe image data carrying phase information of the object; subjecting the whole or part of fringe image data to arithmetic processing using Fourier transform so as to determine a tilt frequency of a fringe corresponding to an inclination of the object in the fringe image data; and detecting the inclination of the object according to the tilt frequency.

27 Claims, 9 Drawing Sheets

METHOD OF DETECTING POSTURE OF OBJECT AND APPARATUS USING THE SAME

RELATED APPLICATIONS

This application claims the priorities of Japanese Patent Application No. 2000-397246 filed on Dec. 27, 2000 and Japanese Patent Application No. 2001-354545 filed on Nov. 20, 2001, which are incorporated herein by reference.

BACKGROUND OF THE INVENTION

1. Field of the Invention

The present invention relates to a method of detecting a posture of an object by which an inclination of the object is detected, and an apparatus using the same. In particular, the present invention relates to a method of detecting a posture of an object by which the posture (inclination) of the object is automatically detected when the object (or a reference) is shifted by use of an actuator in an automatic stage or automatic measuring device such as an interferometer, and an apparatus using the same.

2. Description of the Prior Art

Figure 10:
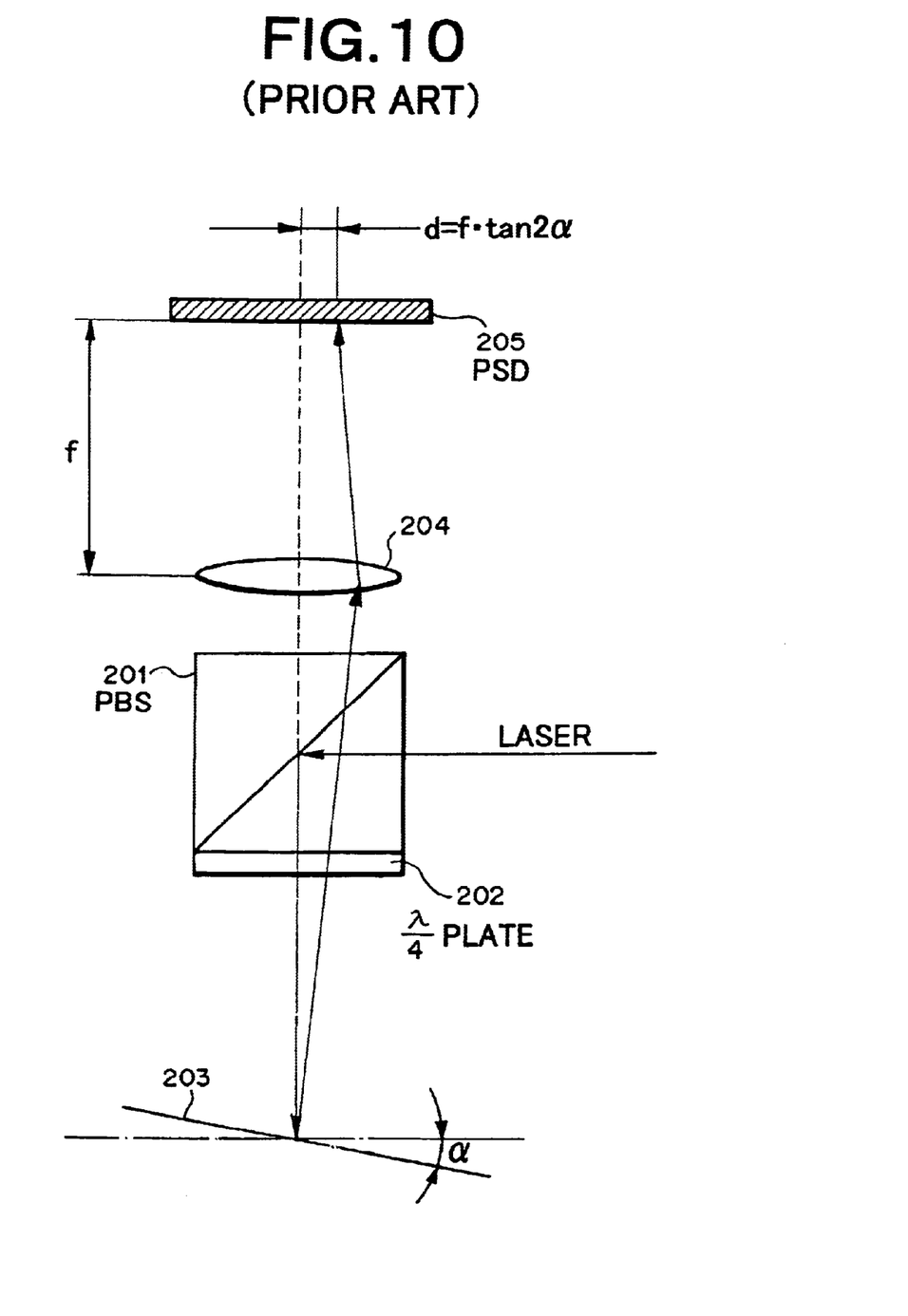
FIG. 10 is a schematic view for explaining the prior art.

As an apparatus for detecting a posture (pitching, rolling, or the similar) of a moving object, an autocollimator such as the one shown in FIG. 10 has conventionally been known. This autocollimator is one which irradiates an object 203 with a laser luminous flux by way of a PBS 201 and a quarter-wave plate 202; illuminates a PSD (Position Sensitive Device) 205, which is an analog position sensor, with the luminous flux reflected by the object 203 by way of the quarter-wave plate 202, the PBS 201, and a lens 204; and determines the posture (inclination a) of the object 203 according to the distance d from the center axis of the PSD 205 to the position irradiated with the luminous flux. The inclination a in this case is determined by use of the expression of d=f·tan 2α (where f is the focal length of the lens 204).

Since the detection accuracy of the autocollimator is proportional to the focal length f of the lens 204 as can be seen from the above-mentioned expression, the focal length f increases when the detection accuracy is to be raised, whereby the apparatus becomes larger.

Figure 11:
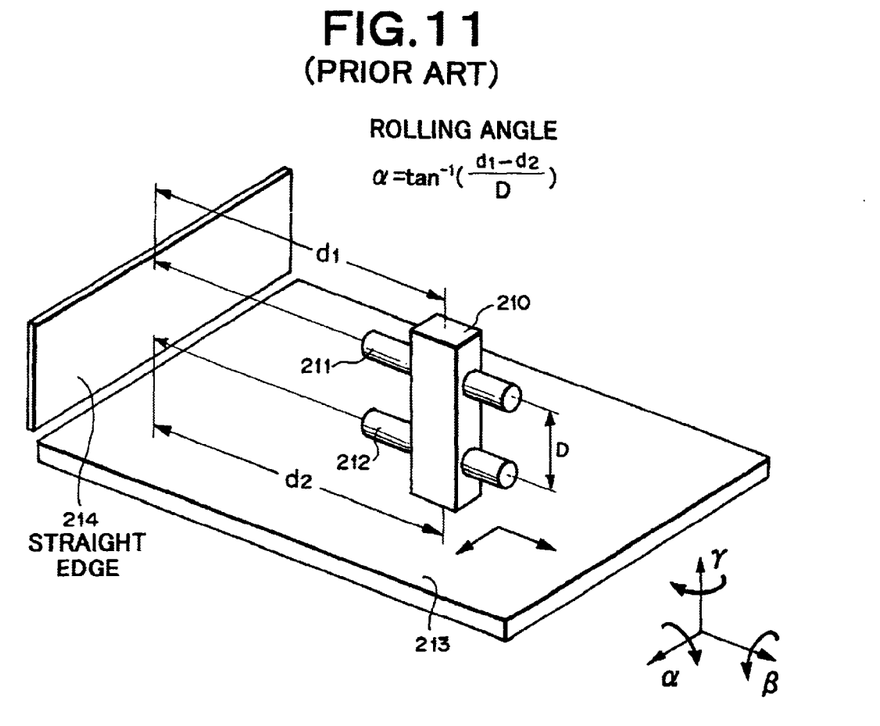
FIG. 11 is a schematic view for explaining the prior art.

Therefore, in order to enable highly accurate detection while preventing the apparatus from becoming larger, a technique has been known in which, as shown in FIG. 11 for example, two interference displacement meters 211, 212 are installed in parallel in an object 210, the difference between the respective distances $d_1$, $d_2$ from the interference displacement meters 211, 212 to a straightedge 214 arranged perpendicular to a reference table 213 is determined, and the posture (rolling angle) of the object 210 is calculated from this difference. Specifically, the rolling angle is expressed by:

$$\alpha = \tan^{-1}[(d_1 - d_2)/D]$$

where D is the distance between the two interference displacement meters 211, 212.

In such a technique, however, it is necessary for the interference displacement meters 211, 212 to be attached directly to the object. Since this technique fails to provide a so-called non-contact type, various problems occur, and it is also problematic in that the configuration of the apparatus becomes too complicated. In particular, at least three interference displacement meters are necessary in the two-dimensional posture detection, whereby their mutual alignment adjustment becomes complicated. Further, it is necessary to detect the above-mentioned distance D precisely, which makes the system hard to adjust.

SUMMARY OF THE INVENTION

In order to overcome the problems mentioned above, it is an objective of the present invention to provide a method of detecting a posture of an object by which the posture of the object, such as a two-dimensional posture in particular, can be obtained by a highly-accurate, high-speed, non-contact, and simple system configuration, and an apparatus using the same.

The present invention provides a method of detecting a posture of an object, by which a relative inclination of the object with respect to a reference is detected, the method comprising the steps of:

acquiring fringe image data carrying phase information of the object;

subjecting the whole or part of the fringe image data to arithmetic processing using Fourier transform so as to determine a tilt frequency of a fringe corresponding to an inclination of the object in the fringe image data; and detecting the inclination of the object according to the tilt frequency.

The tilt frequency may be determined by defining positional coordinates of a predetermined peak in peaks on a frequency coordinate system obtained by the Fourier transform and carrying out an arithmetic operation for calculating the tilt frequency according to the positional coordinates.

The present invention provides an apparatus for detecting a posture of an object, which detects phase information from the object and a relative inclination of the object with respect to a reference, the apparatus comprising:

fringe image data acquiring means for acquiring fringe image data carrying the phase information from the object;

Fourier transform arithmetic means for subjecting the whole or part of the fringe image data to arithmetic processing using Fourier transform;

tilt frequency calculation means for determining a tilt frequency of a fringe corresponding to an inclination of the object in the fringe image data; and object inclination detection means for detecting an inclination of the object according to the tilt frequency.

The present invention provides a method of detecting a posture of an object, by which a relative inclination of the object with respect to a reference is detected, the method comprising the steps of:

acquiring fringe image data carrying phase information of the object;

subjecting the whole or part of the fringe image data to arithmetic processing using Fourier transform so as to determine phase information including an inclination of the object; and subjecting thus obtained phase information of the object to a predetermined arithmetic operation so as to detect the inclination of the object.

The phase information of the object may be determined by defining a predetermined spectrum distribution of a fringe corresponding to the inclination of the object in spectrum distributions on a frequency coordinate system obtained by the Fourier transform and carrying out an arithmetic operation for calculating the phase information according to the predetermined spectrum distribution.

Preferably, the predetermined arithmetic operation is an arithmetic operation for determining a least-square plane fitting the phase information of the object.

The present invention provides an apparatus for detecting a posture of an object, which detects phase information from the object and a relative inclination of the object with respect to a reference, the apparatus comprising:

fringe image data acquiring means for acquiring fringe image data carrying phase information from the object;

Fourier transform arithmetic means for subjecting the whole or part of the fringe image data to arithmetic processing using Fourier transform;

object phase information calculation means for determining phase information including an inclination of the object according to the fringe image data subjected to the Fourier transform; and object inclination detection means for detecting the inclination of the object according to the phase information of the object.

The method and apparatus for detecting a posture of an object in accordance with the present invention are particularly effective when the object or a reference body providing a reference for the inclination of the object is a moving member movable by an actuator. The actuator may be a piezoelectric device.

The present invention provides a method of detecting a posture of an object, by which a change in inclination of the object between before and after a movement thereof is detected, the method comprising:

a first step of acquiring first fringe image data carrying phase information of the object before the movement, subjecting the whole or part of the first fringe image data to arithmetic processing using Fourier transform so as to determine a tilt frequency of a fringe corresponding to an inclination of the object before the movement in the first fringe image data, and detecting inclination information of the object before the movement according to the tilt frequency;

a second step of acquiring second fringe image data carrying phase information of the object after the movement, subjecting the whole or part of the second fringe image data to arithmetic processing using Fourier transform so as to determine a tilt frequency of a fringe corresponding to an inclination of the object after the movement in the second fringe image data, and detecting inclination information of the object after the movement according to the tilt frequency; and a third step of determining a difference in inclination information of the object between before and after the movement detected by the first and second steps, and detecting a change in inclination of the object between before and after the movement.

The present invention provides a method of detecting a posture of an object, by which a change in inclination of the object between before and after a movement is detected, the method comprising:

a first step of acquiring first fringe image data carrying phase information of the object before the movement, and subjecting the whole or part of the first fringe image data to arithmetic processing using Fourier transform so as to determine a tilt frequency of a fringe corresponding to an inclination of the object before the movement in the first fringe image data;

a second step of acquiring second fringe image data carrying phase information of the object after the movement, and subjecting the whole or part of the second fringe image data to arithmetic processing using Fourier transform so as to determine a tilt frequency of a fringe corresponding to an inclination of the object after the movement in the second fringe image data; and a third step of determining a difference between the tilt frequencies of the fringes corresponding to the inclinations of the object before and after the movement determined by the first and second steps, and detecting a change in inclination of the object between before and after the movement according to thus determined difference.

In the method or apparatus for detecting a posture of an object in accordance with the present invention, the phase information may be interference fringe information.

In the present invention, the apparatus may be a Michelson type interferometer. The object may have a rough surface.

In the present invention, the relative inclination of the object with respect to a reference refers to a relative angle between the reference (e.g., a horizontal plane, a reference surface in an interferometer, etc.) for determining an inclination and a surface (posture reference surface) acting as a reference for detecting the posture of the object. As the posture reference surface of the object, a face (surface) whose form is to be measured in a lightwave interferometer, a surface of the object coming into contact with a mounting table, and the like, for example, can be set when appropriate.

As for the background art of the present invention, the disclosure in the following publication has been known, for example:

M. Takeda, H. Ina and S. Kobayashi: Fourier transforms method of fringe-pattern analysis for computer-based topography and interferometry, J. Opt. Soc. Am. 72 (1982), p. 156.

The above-mentioned publication discloses that a plurality of Fourier spectrum peaks including a peak corresponding to a carrier fringe can be obtained when the carrier fringe is superposed on a fringe image and then the resulting data is subjected to Fourier transform. This is basically different in terms of the idea and purpose from the present invention, which takes account of meanings of individual peaks and spectrum distributions of a Fourier spectrum and detects a posture of an object according to a predetermined isolated peak or spectrum distribution.

Namely, the Fourier transform fringe analysis method disclosed in the above-mentioned publication artificially provides a relative inclination between an object and a reference in order to analyze phase information inherent in the object such as a surface form thereof, thereby superposing a carrier fringe onto a fringe image. On a frequency space obtained upon the Fourier transform, the information of the artificially superposed carrier fringe is isolated, as a frequency (carrier frequency) corresponding to the carrier fringe, from the phase information inherent in the object.

By contrast, without artificially superposing the carrier fringe, the present invention captures the inclination of the object inclined beforehand as phase information inherent in the object. When the phase information including the inclination is subjected to Fourier transform, the frequency corresponding to the inclination of the object on a frequency space can be isolated as with the artificially superposed carrier frequency mentioned above.

In the present specification, the frequency on a frequency space corresponding to the inclination of the object will be referred to as "tilt frequency" so as to clarify that it is different from the artificially superposed carrier frequency.

DESCRIPTION OF THE PREFERRED EMBODIMENTS

In the following, the method of detecting a posture of an object in accordance with an embodiment of the present invention will be explained with reference to the drawings.

In this method, when detecting an inclination of an object, fringe image data carrying phase information from the object is acquired, then the whole or part of each fringe image data is subjected to Fourier transform, so as to determine a tilt frequency of a fringe component corresponding to the inclination of the object in the fringe image data or phase information of the object in the fringe image data, and the inclination of the object is determined according to thus obtained tilt frequency in the former or according to thus obtained phase information of the object in the latter.

In the following, the method of detecting a posture of an object in accordance with the embodiment of the present invention will be explained specifically with reference to Example 1 for the former and Example 2 for the latter.

In the following Examples, while exemplifying an interference fringe image as a fringe image, the case where a relative posture of an object with respect to a reference surface is inclined due to a movement of the object (or reference surface) will be explained.

Also, in the following Examples 1 and 2, the posture reference surface of the object is set to a substantially smooth measurement face (surface) of the object, whereas the reference for determining the inclination of the object is set to the reference surface of an interferometer. Namely, the inclination of the object detected in this embodiment refers to the relative angle between the reference surface and the object surface (the difference between the angle of the reference surface with respect to the optical axis and the angle of the object surface with respect to the optical axis to be exact) after the movement.

When the surface of the object and its backside (facing the mounting table) are both considered smooth and parallel to each other, the detected inclination of the object can be considered substantially identical to the relative angle between the reference surface and the mounting table, whereby the relative inclination of the mounting table can be determined in this case.

EXAMPLE 1

The method of detecting a posture of an object in accordance with Example 1 will be explained with reference to the flowchart of FIG. 1.

First, an interference fringe image (see FIG. 2) carrying phase information (form information here, ditto in the following) of an object is obtained by a CCD image pickup camera (S1). Subsequently, thus obtained interference fringe image data is subjected to Fourier transform (S2), a tilt frequency ($f_x$, $f_y$) of a fringe component corresponding to the inclination of the object is extracted by filtering (S3), and the inclination of the object is determined according to the tilt frequency (S4).

When the object is inclined, a state similar to a case where a carrier frequency (relative inclination between the object surface and the reference surface) is artificially introduced in a conventional Fourier transform fringe analysis method occurs, whereby the phase and inclination of the object surface can be determined from a single fringe image alone. The interference fringe intensity including the tilt frequency ($f_x$, $f_y$) of the fringe component corresponding to the inclination of the object is represented by the following expression (1):

$$i(x,y)=a(x,y)+b(x,y)\cos[2\pi f_x x+2\pi f_y y+\phi(x,y)] \quad (1)$$

where
$a(x, y)$ is the background of interference fringes;
$b(x, y)$ is the visibility of fringes;
$\phi(x, y)$ is the phase of the object; and
$f_x$ and $f_y$ are tilt frequencies.

The above-mentioned expression (1) can be changed into the following expression (2):

$$i(x,y)=a(x,y)+c(x,y)\exp[i(2\pi f_x+2\pi f_y)]+c(x,y)\exp[-i(2\pi f_x+2\pi f_y)] \quad (2)$$

where $$c(x,y)=\frac{b(x,y)\exp[i\phi(x,y)]}{2}. \quad (3)$$

The Fourier transform of expression (2) gives following expression (4):

$$I(\eta,\zeta)=A(\eta,\zeta)+C(\eta-f_x,\zeta-f_y)+C^*(\eta+f_x,\zeta+f_y) \quad (4)$$

where
$A(\eta, \zeta)$ is the Fourier transform of $a(x, y)$;
$C(\eta-f_x, \zeta-f_y)$ is a Fourier transform of $c(x,y)\exp[i(2\pi f_x+2\pi f_y)]$; and
$C^*(\eta-f_x, \zeta-f_y)$ is a Fourier transform of $c^*(x,y)\exp[-i(2\pi f_x+2\pi f_y)]$.

Meanwhile, as mentioned above, ($f_x$, $f_y$) is the tilt frequency and is represented by the following set of expressions (5):

$$f_x = \frac{2 \cdot \tan\theta_x}{\lambda}, \qquad (5)$$

$$f_y = \frac{2 \cdot \tan\theta_y}{\lambda}.$$

Namely, the tilt frequency ($f_x$, $f_y$) also represents the optical relative angle (relative posture) between the object surface and the reference surface. Therefore, the optical relative angle (relative posture) between the object surface and the reference surface can be determined when the tilt frequency ($f_x$, $f_y$) is determined.

Figure 3:
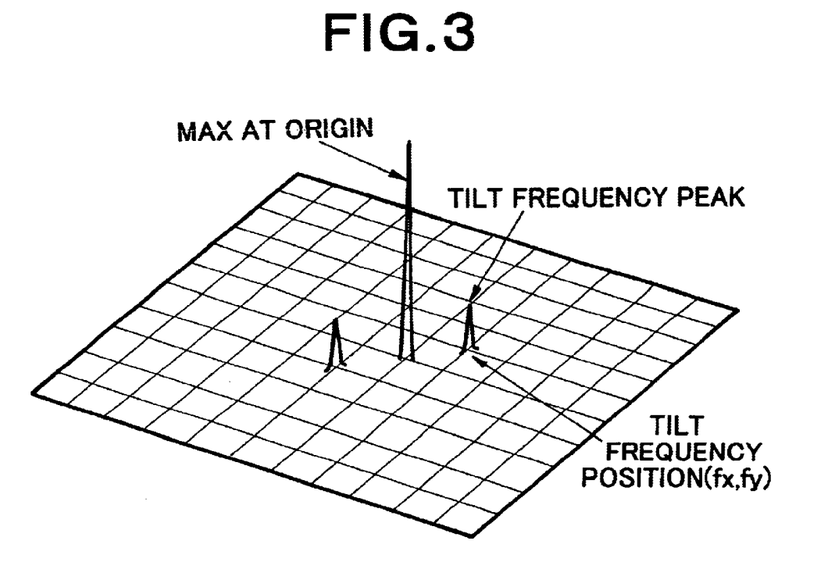
FIG. 3 is a schematic view showing a Fourier spectrum appearing on a frequency coordinate system.

Hence, from the results of the above-mentioned Fourier transform, the position of a peak of a tilt frequency spectrum on a frequency coordinate system such as the one shown in FIG. 3 is determined. Namely, the peak position of $C(\eta-f_x, \zeta-f_y)$ is determined, whereby ($f_x$, $f_y$) is obtained. Then, according to the above-mentioned expression (5), $q_x$ and $q_y$, which are respective inclinations (postures) of the measurement surface in x and y directions, can be determined.

Thus, the inclination of the object can easily be determined according to the tilt frequency ($f_x$, $f_y$) obtained by subjecting the fringe image data to Fourier transform.

EXAMPLE 2

The method of detecting a posture of an object in accordance with Example 2 will now be explained with reference to the flowchart of FIG. 4.

First, an interference fringe image (see FIG. 2) carrying phase information of an object is obtained by a CCD image pickup camera (S11). Subsequently, thus obtained interference fringe image data is subjected to Fourier transform (S12), and $C(\eta-f_x, \zeta-f_y)$, which is a spectrum distribution (side lobe) of tilt frequency, is extracted by filtering (S13). Then, this distribution $C(\eta-f_x, \zeta-f_y)$ is subjected to inverse Fourier transform, so as to obtain c(x, y), thus yielding a wrapped phase (S14). Thereafter, unwrapping processing is carried out, so as to determine the phase p(x, y) of the object according to the form information of the object (S15). Then, a least-square plane of the phase p(x, y) is determined by use of least-square method (S16). Finally, the inclination of the object is determined according to differential coefficients of the least-square plane (S17).

In the conventional Fourier fringe analysis methods, such as the above-mentioned technique of M. Takeda et al., for example, $C(\eta-f_x, \zeta-f_y)$, which is a spectrum distribution (side lobe) of carrier frequency on a frequency coordinate system, is extracted, a peak thereof is then moved from its position ($f_x$, $f_y$) to the origin of coordinates so as to eliminate the carrier frequency, and inverse Fourier transform is carried out thereafter so as to determine the phase (form) of the object.

In this example, by contrast, the inclination of the object is considered to be a part of the form, and the spectrum distribution (side lobe) of tilt frequency in the above-mentioned expression (4) is subjected to inverse Fourier transform without moving the peak thereof, i.e., without eliminating the tilt frequency. As a result, the finally obtained phase p(x, y) of the object includes an inclination component.

Namely, the above-mentioned phase p(x, y) is represented as in the following expression (6):

$$p(x, y) = 2\pi f_x x + 2\pi f_y y + \phi(x, y) \qquad (6)$$
$$= ax + by + \phi(x, y)$$
$$= \tan(\theta_x)x + \tan(\theta_y)y + \phi(x, y)$$

where a is the differential coefficient of the least-square plane in x direction; and b is the differential coefficient of the least-square plane in y direction.

Thus, this example uses least-square method so as to determine a least-square plane of the form of the object determined without eliminating the tilt frequency (i.e., a plane obtained by fitting the form by least-square method), defines differential coefficients in x and y directions of the least-square plane, and obtains the inclinations $q_x$ and $q_y$ of the object by using the above-mentioned expression (6), thereby being able to determine the inclination of the object easily.

In Example 2, fitting techniques other than the least-square method may be employed when determining a plane representative of the form of the object, whereby a desirable plane fitting a curved surface can also be determined.

The method of detecting a posture of an object in accordance with the present invention may be configured such that an inclination of the object is also determined at a point of time before a movement thereof by a technique similar to that mentioned above so as to be defined as a reference posture of the object, and the angle at that time is subtracted from the angle of the object determined after the movement as mentioned above, so as to determine the change in posture of the object.

EXAMPLE 3

Figure 5:
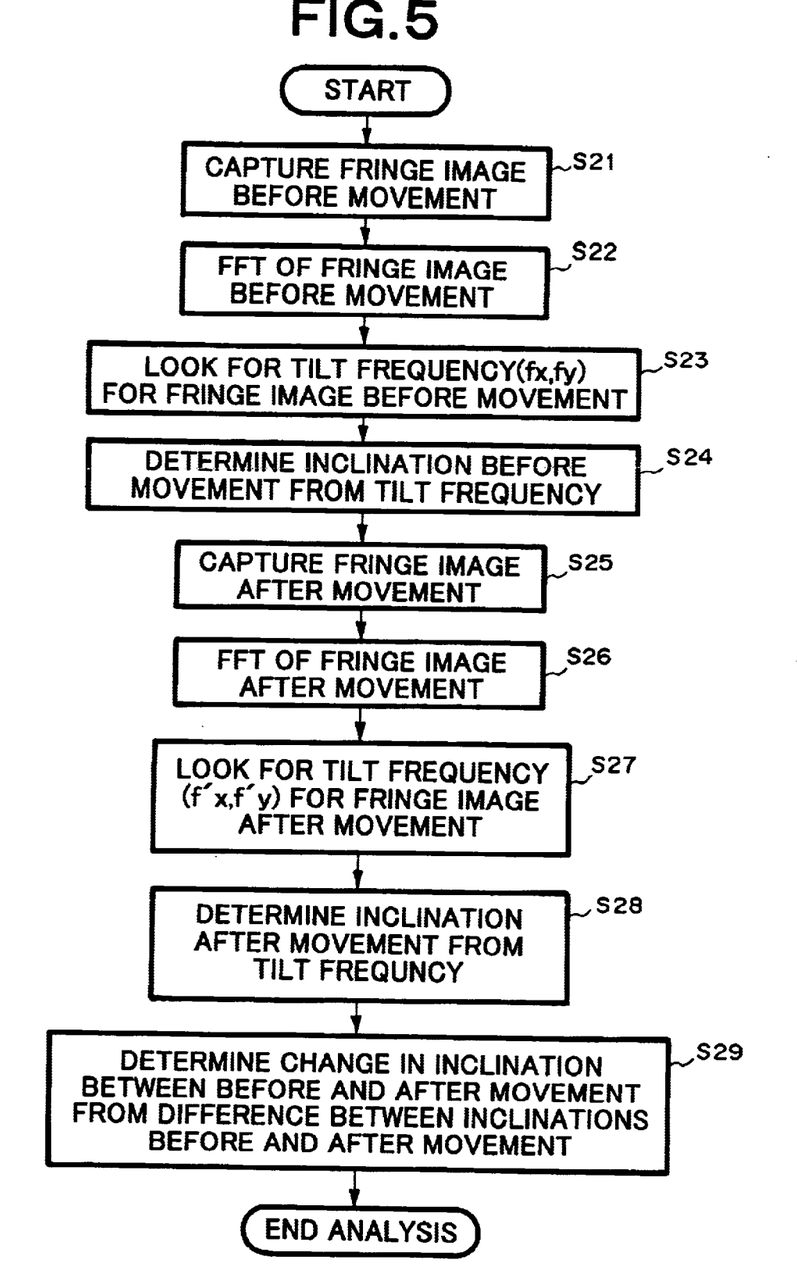
FIG. 5 is a flowchart for explaining a method of detecting a posture of an object in accordance with Example 3 of the present invention.

The method of detecting a posture of an object in accordance with Example 3, by which the change in posture of the object is determined from respective fringe images before and after a movement of the object, will now be explained with reference to the flowchart of FIG. 5.

First, an interference fringe image (see FIG. 2) carrying phase information of an object before a movement is obtained by a CCD image pickup camera (S21). Subsequently, thus obtained interference fringe image data is subjected to Fourier transform (S22), a tilt frequency ($f_x$, $f_y$) of a fringe component corresponding to the inclination of the object before the movement is extracted by filtering (S23), and the inclination of the object before the movement is determined according to this tilt frequency (S24).

Then, an interference fringe image carrying phase information of an object after the movement is obtained by the CCD image pickup camera (S25). Thus obtained interference fringe image data after the movement is subjected to Fourier transform (S26), a tilt frequency ($f_x'$, $f_y'$) of a fringe component corresponding to the inclination of the object after the movement is extracted by filtering (S27), and the inclination of the object after the movement is determined according to this tilt frequency (S28). From the difference between thus obtained inclinations of the object before and after the movement, the change in inclination of the object between before and after the movement is determined (S29).

Though this example determines the respective inclinations before and after a movement and obtains the change in inclination of the object between before and after the movement according to the difference therebetween, the change in inclination of the object between before and after the movement may be determined from the difference between the tilt frequency concerning the fringe image before the movement and the tilt frequency concerning the fringe image after the movement.

Also, the technique of the above-mentioned Example 2 may be applied to the respective fringe images before and after the movement, and the change in inclination of the object between before and after the movement may be determined from the difference between thus determined inclinations of the object before and after the movement.

In this case, the respective least-square planes of the form of the object before and after the movement may be determined, so as to obtain the change in inclination of the object between before and after the movement from the difference between the respective inclinations of the two least-square planes before and after the movements. Alternatively, the respective forms of the object before and after the movement may be determined, so as to yield the respective differential coefficients in x and y directions of the least-square plane corresponding to the difference between the two forms before and after the movement and thereby obtain the change in inclination of the object between before and after the movement.

In the method of detecting a posture of an object in accordance with the present invention, it is not necessary to use the whole fringe image when carrying out Fourier transform. Sufficiently favorable results can also be obtained even when only part of the fringe image is subjected to Fourier transform. Further, it is not necessary for the object to have a surface with a high reflectivity. Favorable results can also be obtained even when the object has a rough surface.

Apparatus for detecting Posture of Object

An apparatus for carrying out the method of the above-mentioned embodiment will now be explained with reference to FIGS. 6 to 8. The following explanation will exemplify a case where the present invention is applied to an interferometer apparatus.

Figure 7:
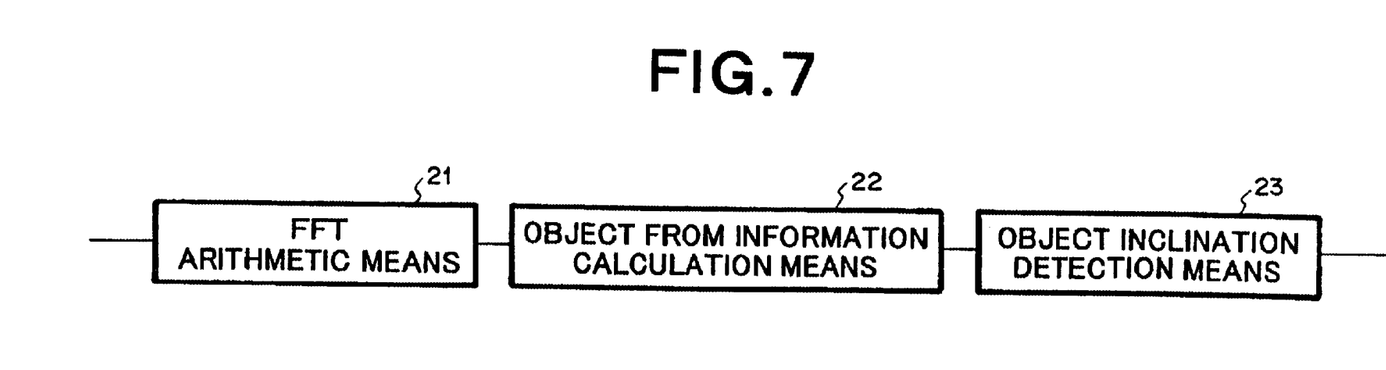
FIG. 7 is a block diagram showing a part of an apparatus for carrying out the method in accordance with Example 2 of the present invention.
Figure 8:
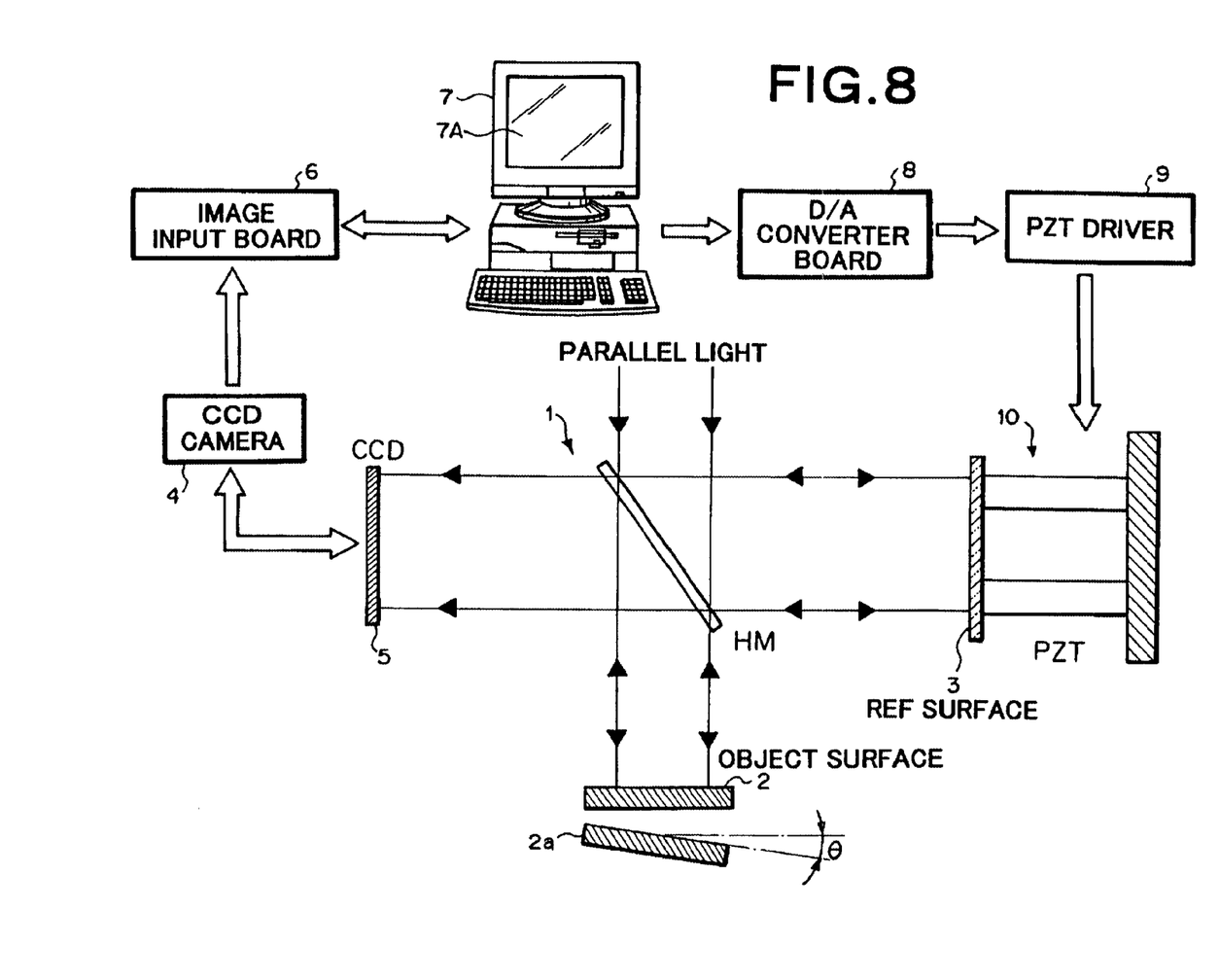
FIG. 8 is a block diagram showing a schematic configuration of an apparatus for realizing the methods in accordance with Examples 1 to 3 of the present invention.

As shown in FIG. 8, in a Michelson type interferometer 1, interference fringes formed by respective reflected luminous fluxes from an object surface 2 and a reference surface 3 are captured at an imaging surface of CCD 5 of an image pickup camera 4, and are fed into a computer 7 equipped with a CPU and an image processing memory by way of an image input board 6. Thus input interference fringe image data is subjected to various arithmetic operations by arithmetic means such as those shown in FIGS. 6 and 7, and the results of operations are displayed on a monitor screen 7A. Here, the interference fringe image data output from the image pickup camera 4 is temporarily stored into the memory upon an operation of the CPU.

In this apparatus, as shown in FIG. 8, a PZT (piezoelectric device) actuator 10 carries out a relative shift amount of translational displacement between the object surface 2 and the reference surface 3, i.e., a movement of a member, by way of a D/A converter board and a piezoelectric driver 9 according to instructions from the computer 7.

Since this apparatus is configured such that a moving member is driven by the PZT (piezoelectric device) actuator 10, a change may occur in the relative inclination between the object surface 2 and the reference surface 3 during an operation for driving the moving member. This apparatus can accurately detect such a change in relative inclination by itself.

In the case where the posture control such as the one mentioned above is not carried out, the reference surface 3 (or the object surface 2) may be vibrated back and forth in the optical axis direction by use of the PZT (piezoelectric device) actuator 10 so as to carry out fringe scanning. In this case, such an operation is carried out after the relative inclination between the above-mentioned two surfaces 2 and 3 is corrected.

In the following, two modes of the PZT (piezoelectric device) actuator 10 will be explained with reference to FIGS. 9A and 9B.

Figure 9A:
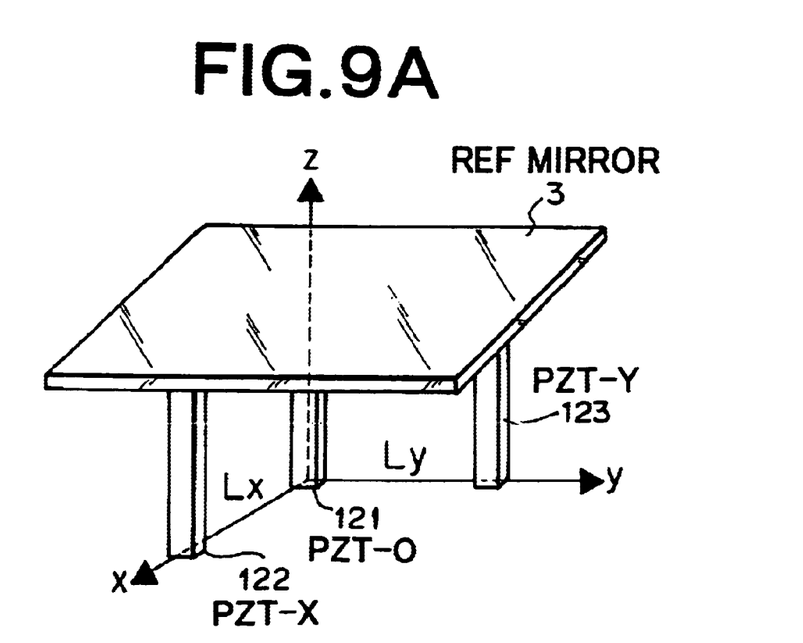
FIGS. 9A and 9B are schematic views specifically showing a part of FIG. 8.

As shown in FIG. 9A, the first mode is configured such that three piezoelectric devices 121, 122, 123 for supporting the backside of the reference surface (reference mirror) 3 are provided, while two lines $L_x$, $L_y$ connecting the piezoelectric device 121, which also functions as a fulcrum, to the respective piezoelectric devices 122, 123 on the reference mirror having the reference surface 3 are orthogonal to each other. When the three piezoelectric devices 121, 122, 123 expand or shrink by the same amount, the reference surface 3 of the reference mirror is translated along the z axis. When only the piezoelectric device 122 expands or shrinks, the reference surface 3 of the reference mirror inclines in the x-axis direction so as to rotate about the y axis. When only the piezoelectric device 123 expands or shrinks, the reference surface 3 of the reference mirror inclines in the y-axis direction so as to rotate about the x axis. The relationship between the tilt frequency and the inclination is represented by the following set of expressions (7):

$$f_x = \frac{2 \cdot \tan\theta_x}{\lambda} = \frac{2 \cdot (L_{PZT-X} - L_{PZT-O})}{L_x \cdot \lambda}, \qquad (7)$$

$$f_y = \frac{2 \cdot \tan\theta_y}{\lambda} = \frac{2 \cdot (L_{PZT-Y} - L_{PZT-O})}{L_y \cdot \lambda}$$

where $\theta_x$ and $\theta_y$ are the respective inclinations of an average plane of the object surface in x and y directions; and $L_{PZT-O}$, $L_{PZT-X}$, and $L_{PZT-Y}$ are the respective amounts of translational displacement of the individual PZT actuators.

Figure 9B:
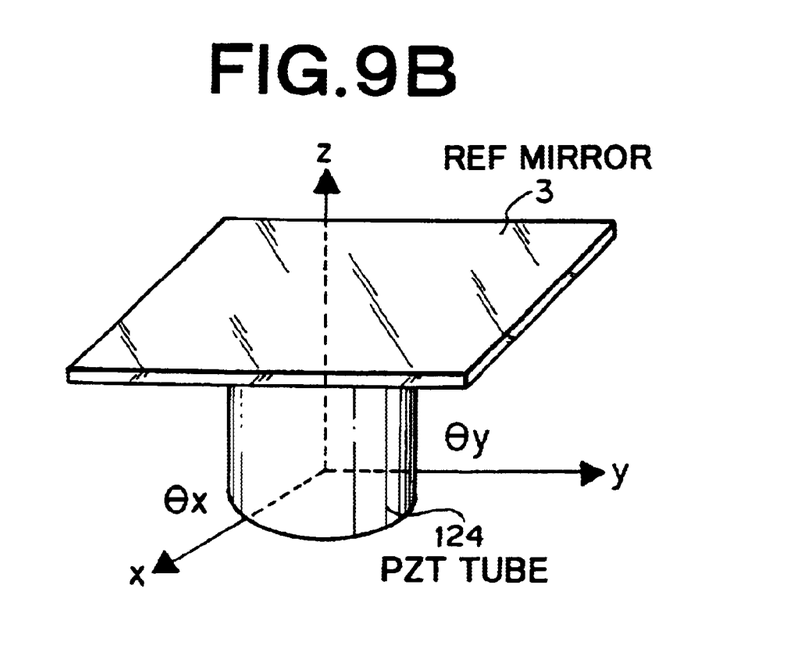

The second mode, on the other hand, is configured such that the center part of the backside of the reference surface (reference mirror) 3 is supported by a columnar piezoelectric tube 124 as shown in FIG. 9B. The reference surface 3 of the reference mirror is translated when the piezoelectric tube 124 expands or shrinks without being biased, and is freely inclined in the x- and y-axis directions when the piezoelectric tube 124 expands or shrinks while being biased. In the second mode, the relationship between the tilt frequency and the inclination is represented by expressions similar to the above-mentioned set of expressions (7).

In each of the above-mentioned modes, however, errors may occur in the relative inclination between the object surface 2 and the reference surface 3 due to the expanding/shrinking accuracy of the three piezoelectric devices 121, 122, 123 or the piezoelectric tube 124. This apparatus can detect the inclination in such a case favorably and easily.

The internal configuration of the computer constituting a major part of the inclination detecting function will now be explained.

Figure 6:
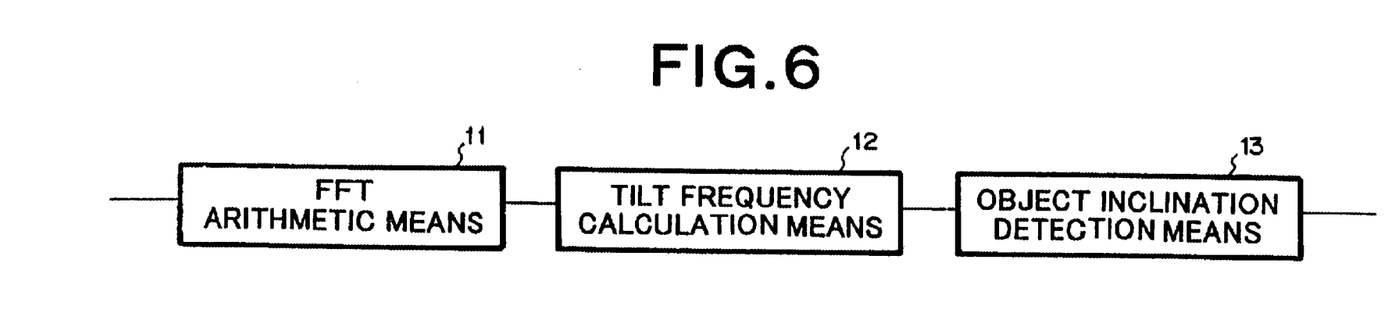
FIG. 6 is a block diagram showing a part of an apparatus for carrying out the method in accordance with Example 1 of the present invention.

In a first mode, the computer 7 comprises, in terms of software, an FFT arithmetic means 11, a tilt frequency calculation means 12, and an object inclination detection means 13 as shown in FIG. 6.

Figure 1:
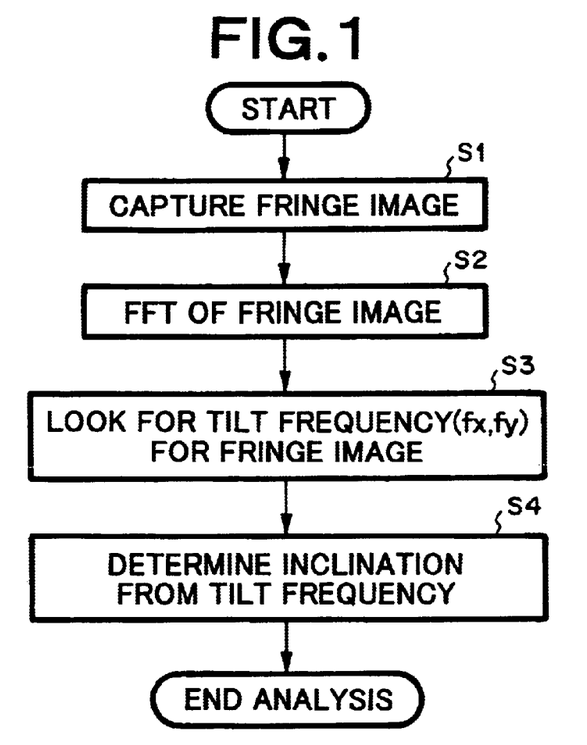
FIG. 1 is a flowchart for explaining a method of detecting a posture of an object in accordance with Example 1 of the present invention.
Figure 2:
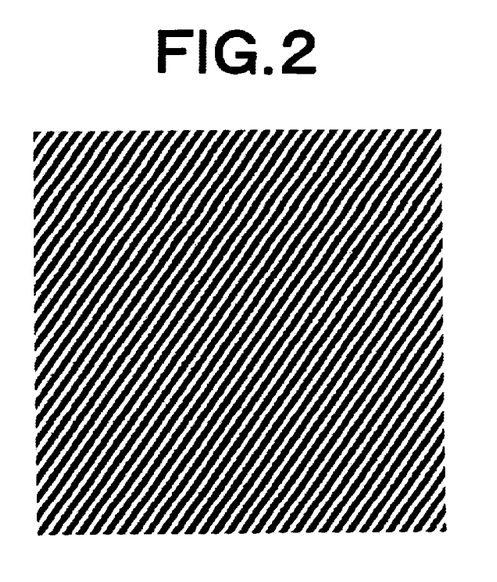
FIG. 2 is a schematic view showing fringe image data used in the method in accordance with an embodiment of the present invention.

As mentioned above, the FFT arithmetic means 11 carries out the operation of step 2 (S2) in FIG. 1 for subjecting the whole or part of the obtained interference fringe image data to Fourier transform. The tilt frequency calculation means 12 determines the tilt frequency according to the Fourier spectrum calculated by the FFT arithmetic means 11, and carries out an operation corresponding to step 3 (S3). The object inclination detection means 13 detects the inclination of the object according to the tilt frequency calculated by the tilt frequency calculation means 12 (thus corresponding to S4).

In a second mode, the computer 7 comprises, in terms of software, an FFT arithmetic means 21, an object form information calculation means 22, and an object inclination detection means 23 as shown in FIG. 7.

Figure 4:
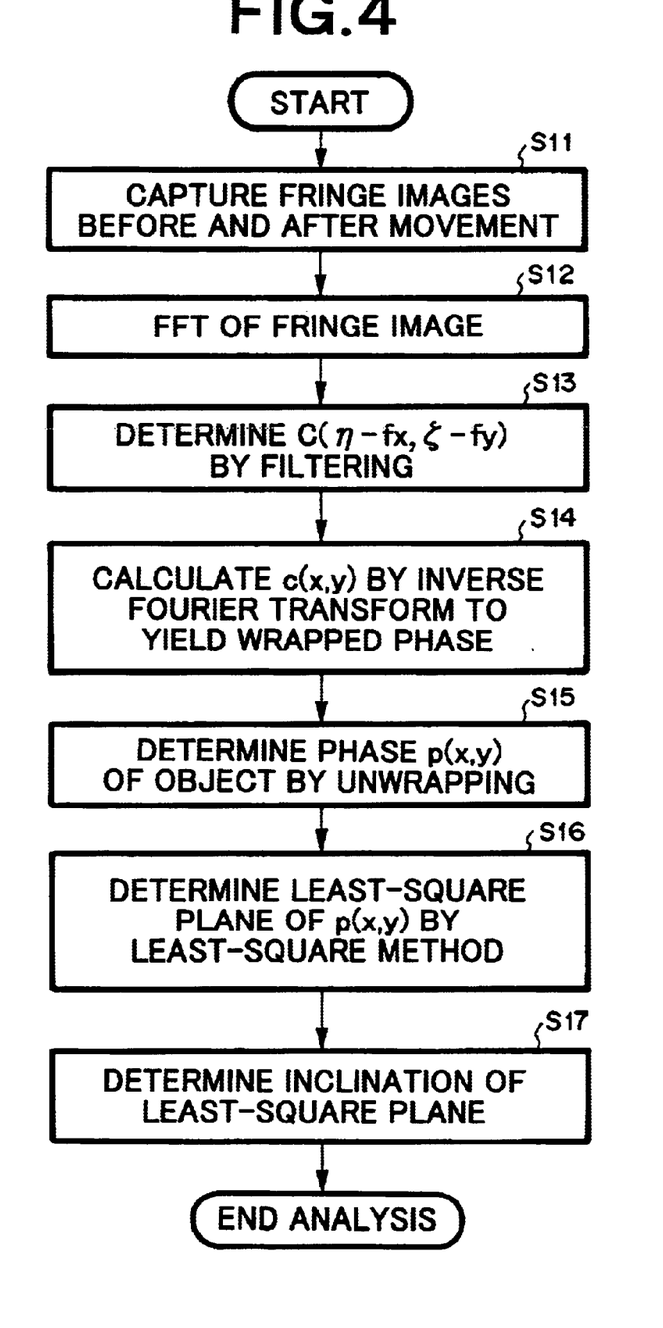
FIG. 4 is a flowchart for explaining a method of detecting a posture of an object in accordance with Example 2 of the present invention.

As mentioned above, the FFT arithmetic means 21 carries out the operation of step 12 (S12) in FIG. 4 for subjecting the whole or part of the obtained interference fringe image data to Fourier transform. The object form information calculation means 22 calculates the form information of the object according to the Fourier spectrum calculated by the FFT arithmetic means 21, thus carrying out an operation corresponding to the above-mentioned steps 13 to 15 (S13 to S15). According to the form information of the object calculated by the object form information calculation means 22, the object inclination detection means 23 determines a least-square plane of the form (a plane obtained by fitting the form with least-square method), thereby detecting the inclination of the object (thus corresponding to S16 and S17).

As a consequence, even in a state where the object surface 2 and the reference surface 3 have an inclination with an optical relative angle of θ by moving relative to each other (schematically indicated by an inclined state of the object surface 2a in FIG. 8), the inclination can easily be detected, whereby the posture of the object (or the posture of the reference surface 3) can always be observed.

Without being restricted to the above-mentioned embodiment, the method and apparatus of the present invention can be modified in various manners. For example, the moving member may be driven not only by the above-mentioned PZT but also by other actuators which can physically move the reference surface or object surface.

Though three PZT devices are arranged in the above-mentioned embodiment such that they are exactly positioned at the respective vertices of a right triangle, they may be arranged so as to form the respective vertices of a given triangle on the reference mirror as a matter of course.

Though the interference fringe image data is captured by use of a Michelson type interferometer in the above-mentioned embodiment, the present invention is similarly applicable to interference fringe image data obtained by other types of interferometers such as those of Fizeau type as a matter of course.

The fringe corresponding to the inclination of the object in the present invention includes not only the fringes occurring when a member is inclined, but also the fringes resulting from the fact that the member itself has a so-called wedge form.

Further, the present invention is similarly applicable to various kinds of fringe images such as moiré fringes and speckle fringes in addition to interference fringes.

In the method of detecting a posture of an object and the method using the same in accordance with the present invention, a single sheet of fringe image data for determining the wavefront of an object is subjected to an arithmetic operation based on Fourier transform, so as to determine a tilt frequency or phase information of the object, according to which the inclination of the object is detected. These operations are carried out by a computer with software.

Therefore, it is not necessary to newly provide a posture detection apparatus, and the time required for the detection can be shortened greatly, whereby the results of detection can be made highly accurate. As a consequence, a two-dimensional posture, in particular, can be obtained by a system configuration which is highly accurate, high-speed, and simple.

What is claimed is:

1. A method of detecting a posture of an object, by which a relative inclination of said object with respect to a reference is detected, said method comprising the steps of:

acquiring fringe image data carrying phase information of said object;

subjecting the whole or part of said fringe image data to arithmetic processing using Fourier transform so as to determine a tilt frequency of a fringe corresponding to an inclination of said object in said fringe image data; and detecting said inclination of said object according to said tilt frequency.

2. A method according to claim 1, wherein said phase information is interference fringe information.

3. A method according to claim 1, wherein said object has a rough surface.

4. A method according to claim 1, wherein said object or a reference body providing said reference is a moving member movable by an actuator.

5. A method according to claim 4, wherein said actuator comprises a piezoelectric device.

6. A method according to claim 1, wherein said tilt frequency is determined by defining positional coordinates of a predetermined peak in peaks on a frequency coordinate system obtained by said Fourier transform and carrying out an arithmetic operation for calculating said tilt frequency according to said positional coordinates.

7. An apparatus for detecting a posture of an object, which detects phase information from said object and a relative inclination of said object with respect to a reference, said apparatus comprising:

fringe image data acquiring means for acquiring fringe image data carrying said phase information from said object;

Fourier transform arithmetic means for subjecting the whole or part of said fringe image data to arithmetic processing using Fourier transform;

tilt frequency calculation means for determining a tilt frequency of a fringe corresponding to an inclination of said object in said fringe image data; and object inclination detection means for detecting an inclination of said object according to said tilt frequency.

8. An apparatus according to claim 7, wherein said phase information is interference fringe information.

9. An apparatus according to claim 7, wherein said apparatus is a Michelson type interferometer.

10. An apparatus according to claim 7, wherein said object or a reference body providing said reference is a moving member movable by an actuator.

11. An apparatus according to claim 10, said actuator comprises a piezoelectric device.

12. A method of detecting a posture of an object, by which a relative inclination of said object with respect to a reference is detected, said method comprising the steps of:

acquiring fringe image data carrying phase information of said object;

subjecting the whole or part of said fringe image data to arithmetic processing using Fourier transform so as to determine phase information including an inclination of said object; and subjecting thus obtained phase information of said object to a predetermined arithmetic operation so as to detect said inclination of said object.

13. A method according to claim 12, wherein said phase information is interference fringe information.

14. A method according to claim 12, wherein said object has a rough surface.

15. A method according to claim 12, wherein said object or a reference body providing said reference is a moving member movable by an actuator.

16. A method according to claim 15, wherein said actuator comprises a piezoelectric device.

17. A method according to claim 12, wherein said phase information of said object is determined by defining a predetermined spectrum distribution of a fringe corresponding to said inclination of said object in spectrum distributions on a frequency coordinate system obtained by said Fourier transform and carrying out an arithmetic operation for calculating said phase information according to said predetermined spectrum distribution.

18. A method according to claim 12, wherein said predetermined arithmetic operation is an arithmetic operation for determining a least-square plane fitting said phase information of said object.

19. An apparatus for detecting a posture of an object, which detects phase information from said object and a relative inclination of said object with respect to a reference, said apparatus comprising:

fringe image data acquiring means for acquiring fringe image data carrying phase information from said object;

Fourier transform arithmetic means for subjecting the whole or part of said fringe image data to arithmetic processing using Fourier transform;

object phase information calculation means for determining phase information including an inclination of said object according to said fringe image data subjected to said Fourier transform; and object inclination detection means for detecting said inclination of said object according to said phase information of said object.

20. An apparatus according to claim 19, wherein said phase information is interference fringe information.

21. An apparatus according to claim 19, wherein said apparatus is a Michelson type interferometer.

22. An apparatus according to claim 19, wherein said object or a reference body providing said reference is a moving member movable by an actuator.

23. An apparatus according to claim 22, said actuator comprises a piezoelectric device.

24. A method of detecting a posture of an object, by which a change in inclination of said object between before and after a movement thereof is detected, said method comprising:

a first step of acquiring first fringe image data carrying phase information of said object before said movement, subjecting the whole or part of said first fringe image data to arithmetic processing using Fourier transform so as to determine a tilt frequency of a fringe corresponding to an inclination of said object before said movement in said first fringe image data, and detecting inclination information of said object before said movement according to said tilt frequency;

a second step of acquiring second fringe image data carrying phase information of said object after said movement, subjecting the whole or part of said second fringe image data to arithmetic processing using Fourier transform so as to determine a tilt frequency of a fringe corresponding to an inclination of said object after said movement in said second fringe image data, and detecting inclination information of said object after said movement according to said tilt frequency; and a third step of determining a difference in inclination information of said object between before and after said movement detected by said first and second steps, and detecting a change in inclination of said object between before and after said movement.

25. A method according to claim 24, wherein said phase information is interference fringe information.

26. A method of detecting a posture of an object, by which a change in inclination of said object between before and after a movement is detected, said method comprising:

a first step of acquiring first fringe image data carrying phase information of said object before said movement, and subjecting the whole or part of said first fringe image data to arithmetic processing using Fourier transform so as to determine a tilt frequency of a fringe corresponding to an inclination of said object before said movement in said first fringe image data;

a second step of acquiring second fringe image data carrying phase information of said object after said movement, and subjecting the whole or part of said second fringe image data to arithmetic processing using Fourier transform so as to determine a tilt frequency of a fringe corresponding to an inclination of said object after said movement in said second fringe image data; and a third step of determining a difference between said tilt frequencies of said fringes corresponding to said inclinations of said object before and after said movement detected by said first and second steps, and detecting a change in inclination of said object between before and after said movement according to thus determined difference.

27. A method according to claim 26, wherein said phase information is interference fringe information.

* * * * *